(12) United States Patent
Voorhees et al.

(10) Patent No.: US 9,424,224 B2
(45) Date of Patent: Aug. 23, 2016

(54) PCIE TUNNELING THROUGH SAS

(71) Applicant: LSI CORPORATION, San Jose, CA (US)

(72) Inventors: William W. Voorhees, Colorado Springs, CO (US); George O. Penokie, Rochester, MN (US); William K. Petty, Colorado Springs, CO (US); Ramprasad Raghavan, Colorado Springs, CO (US); Eugene Saghi, Colorado Springs, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/929,537

(22) Filed: Jun. 27, 2013

(65) Prior Publication Data

US 2014/0372637 A1    Dec. 18, 2014

Related U.S. Application Data

(60) Provisional application No. 61/836,282, filed on Jun. 18, 2013.

(51) Int. Cl.
*G06F 3/00* (2006.01)
*G06F 13/14* (2006.01)
*G06F 13/36* (2006.01)
*G06F 13/42* (2006.01)

(52) U.S. Cl.
CPC ..................................... *G06F 13/42* (2013.01)

(58) Field of Classification Search
None
See application file for complete search history.

(56) References Cited

U.S. PATENT DOCUMENTS

| 7,917,682 | B2 | 3/2011 | Bakthavathsalam | |
|---|---|---|---|---|
| 8,301,810 | B2 | 10/2012 | Pang et al. | |
| 8,332,552 | B2 | 12/2012 | Arimilli et al. | |
| 8,751,836 | B1 * | 6/2014 | Piszczek et al. | 713/300 |
| 2008/0140898 | A1 * | 6/2008 | Bacom et al. | 710/300 |
| 2011/0264840 | A1 * | 10/2011 | Loffink | 710/315 |
| 2012/0166701 | A1 | 6/2012 | Oh et al. | |

FOREIGN PATENT DOCUMENTS

| EP | 2423823 A2 | 2/2012 |
|---|---|---|
| JP | 201248704 A | 8/2012 |
| JP | 2012226739 | 11/2012 |

\* cited by examiner

*Primary Examiner* — David E Martinez

(57) ABSTRACT

Systems and methods presented herein provide for tunneling PCIe data through a SAS domain. a data system includes a SAS expander, a PCIe target device coupled to the expander, and a SAS controller communicatively coupled to a host system and the expander. The controller is operable to open a connection with the expander via the SAS protocol, and to transport packet data between the target device and the host system through the connection via the PCIe protocol. For example, the controller and the expander may be operable to buffer packets of data in the connection. The controller may issue a number of the data packets to be transferred in the connection. Then, the issued number of data packets are transported between the target device and the host system through the connection via the PCIe protocol.

20 Claims, 10 Drawing Sheets

US 9,424,224 B2

PCIE TUNNELING THROUGH SAS

CROSS REFERENCE TO RELATED APPLICATIONS

This document claims priority to U.S. Provisional Patent Application No. 61/836,282 (filed on Jun. 18, 2013) entitled PCIE TUNNELING THROUGH SAS, which is hereby incorporated by reference.

FIELD OF THE INVENTION

The invention generally relates to tunneling Peripheral Component Interconnect Express (PCIe) traffic through Serial Attached Small Computer System Interface (SAS) connections of a SAS domain via the PCIe protocol.

BACKGROUND

Numerous storage device interfaces exist and continually challenge traditional SAS domains. For example, PCIe-based storage devices are now being configured in parallel with traditional SAS domains. These PCIe storage devices may be required to transfer data to and from upstream SAS storage controllers, where the data can then be placed on a native PCIe interface. But, PCIe is a packet based, connectionless transfer protocol and SAS is an end-to-end, connection based protocol that does not provide for connectionless transfers, making interworking particularly challenging.

SUMMARY

Systems and methods presented herein provide for tunneling PCIe traffic through a SAS domain comprising a topology of one or more PCIe capable SAS expanders, one or more traditional SAS expanders, and one or more PCIe capable SAS controllers. The tunneling of PCIe traffic allows PCIe target devices (e.g., SCSI-Over-PCIe (SOP) devices, Non-Volatile Memory Express (NVMe) devices, and Serial AT-Attachment Express (SATAexpress) devices) in the SAS topology to be connected to a PCIe-based host system through a SAS domain, including SAS expanders and a SAS controller. In one embodiment, a data system includes a Serial Attached Small Computer System Interface expander, a Peripheral Component Interconnect Express target device coupled to the expander, and a Serial Attached Small Computer System Interface controller communicatively coupled to a host system and the expander. The controller is operable to open a SAS connection with the expander via the Serial Attached Small Computer System Interface protocol, and to transport packet data between the target device and the host system through the connection via the Peripheral Component Interconnect Express protocol. For example, the controller and the expander may be operable to buffer packets of data in the connection. The controller may issue a number of the data packets to be transferred in the connection. Then, the issued number of data packets are transported between the target device and the host system through the SAS connection via the Peripheral Component Interconnect Express protocol.

The various embodiments disclosed herein may be implemented in a variety of ways as a matter of design choice. For example, the embodiments may take the form of computer hardware, software, firmware, or combinations thereof. Other exemplary embodiments are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
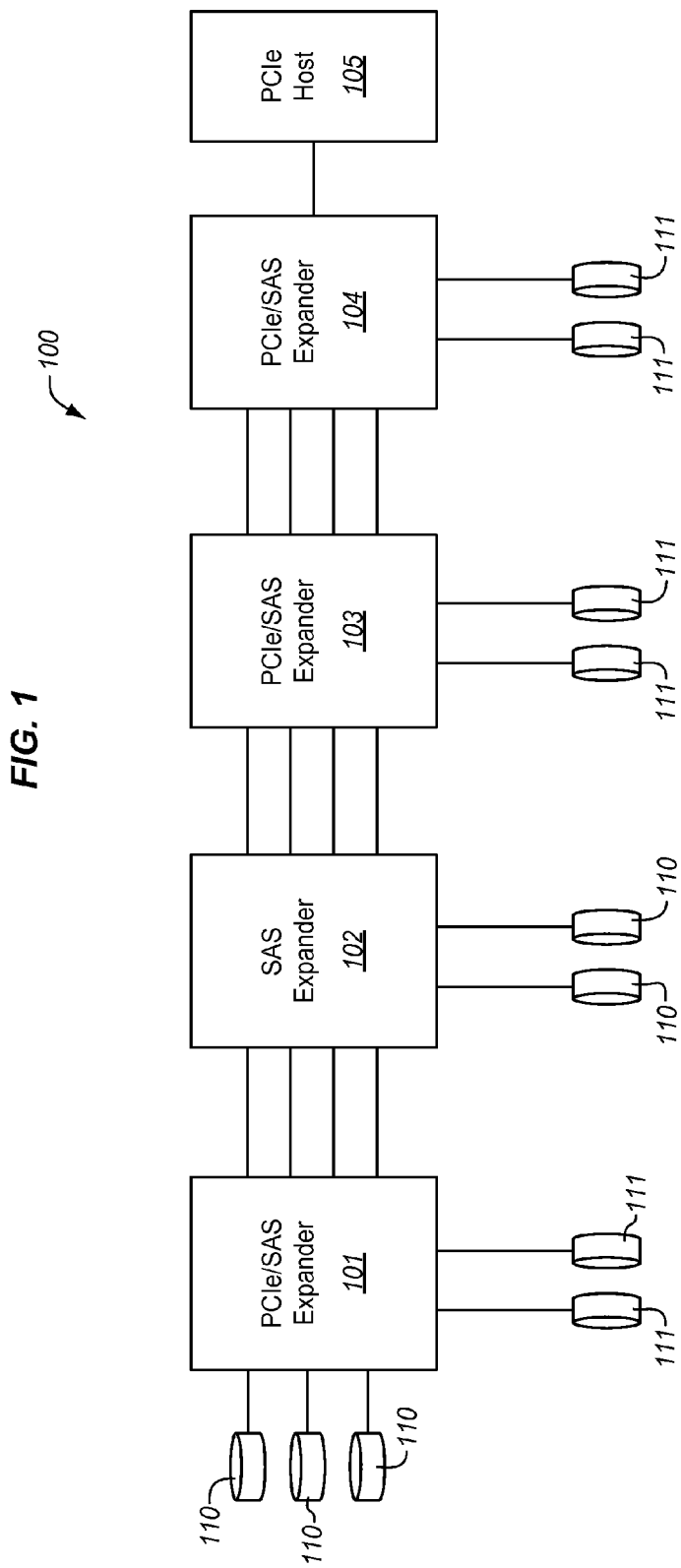
FIG. 1 is a block diagram of an exemplary data system that tunnels PCIe data through a SAS domain.

FIG. 1 is a block diagram of an exemplary data system that tunnels PCIe data through a SAS domain 100. In this embodiment, the SAS domain 100 is configured with a PCIe capable SAS expander (PCIe/SAS expander 101), a traditional SAS expander 102, and another PCIe capable SAS expander (PCIe/SAS expander 103) coupled to a PCIe host system 105 through a PCIe capable SAS controller (PCIe/SAS controller 104). The expander 102 is coupled between the expanders 101 and 103 and is operable to connect to a plurality of SAS target devices 110 via the SAS protocol. The PCIe/SAS expanders 101 and 103 are both operable to connect and communicate with PCIe target devices 111 via the PCIe protocol and SAS target devices 110 (as well as other SAS expanders 102) via the SAS protocol. The combination of the PCIe/SAS controller 104 and a PCIe/SAS expander 101/103 allows the data system 100 to transfer PCIe packet communications between the PCIe host system 105 and PCIe target devices 111 through the SAS domain 100 by tunneling the PCIe packet data through the SAS protocol. The PCIe/SAS controller 104 also translates PCIe data to SAS to route data from the PCIe host system 105 to the appropriate SAS target device 110. In one embodiment, a number of PCIe target devices 111 are directly attached to the PCIe/SAS controller 104 in a manner that allows PCIe packets to flow through a port layer and a PCIe/SAS interworking initiator (explained in greater detail below) of the PCIe/SAS controller 104, thereby providing tunneling within the PCIe/SAS controller 104 alone.

Examples of the PCIe target devices 111 and the SAS target devices 110 include storage devices, such as disk drives and solid state drives (SSDs). In this regard, the target devices 110 and 111 may provide data storage on behalf of the PCIe host system 105. And, the PCIe host system 105 may configure read/write requests via the PCIe protocol for input/output (I/O) operations with any of the target devices 110 and 111 through the SAS domain 100 of the expanders 101, 102, and 103. The PCIe host system 105 may be any suitable computing device or system operable to perform I/O operations via the PCIe protocol including, for example, servers, workstations, personal computers, etc.

The PCIe/SAS controller 104 is any device, system, software, or combination thereof operable to perform device discovery, manage data of the target devices 110 and 111, and process I/O commands directed to that data. For example, the PCIe/SAS controller 104 may be implemented as custom circuitry, as a special or general purpose processor executing programmed instructions stored in an associated program memory, or some combination thereof. The PCIe/SAS controller 104 may be an independent SAS device, a Host Bus Adapter (HBA) of a host, or an integrated component of the PCIe host system 105.

The PCIe/SAS controller 104 includes a front-end interface (shown and described in greater detail below) adapted to couple and communicate packet data with the PCIe host system 105 via the PCIe protocol. The PCIe/SAS controller 104 also includes a backend interface (shown and described in greater detail below) that is adapted to couple to and support both PCIe devices (e.g., PCIe/SAS expanders 101 and 103 and PCIe target devices 111) and SAS devices (e.g., SAS target devices 110 and SAS expanders 102). For example, the PCIe/SAS controller 104 provides PCIe control, SAS connection credit management, and buffering to support multiple remote/SAS expanders such as the expanders 101 and 103. The PCIe/SAS controller 104 also acts as a root complex for the PCIe target devices 111 accessible via the SAS domain 100. The PCIe/SAS controller 104 performs PCIe system enumeration of downstream attached target devices 110 and 111 assists in the SAS domain management.

The SAS expander 102 is any device, system, software, or combination thereof operable to provide a connection-based transfer of data via the SAS protocol. In this regard, the SAS expander 102 may connect to other SAS components, such as SAS target devices 110 and other expanders via a plurality of physical transceivers, or "Phys". The PCIe/SAS expanders 101 and 103 are any devices, systems, software, or combinations thereof operable to support and communicate with SAS target devices 110 as well as attached PCIe devices 111, SAS expanders 102, and other PCIe/SAS expanders. In this regard, the PCIe/SAS expanders 101 and 103 each have a plurality of SAS Phy/PCIe links to service both PCIe and SAS traffic to the target devices 110 and 111, respectively (shown in greater detail below). The PCIe/SAS expanders 101 and 103 are operable to provide PCIe control, device credit management, and buffering to support multiple PCIe devices 111. The PCIe/SAS expanders 101 and 103 are also operable to present a standard SAS interface to the SAS expander 102 and communicate with the expander 102 and other SAS devices (e.g., the SAS target devices 110).

Although the SAS domain 100 is shown and described with respect to a certain number of PCIe/SAS expanders, traditional SAS expanders, PCIe target devices, and SAS devices, the invention is not intended to be any particular number of components in the SAS domain 100 other than what may be limited by the SAS protocol. Certain operational details of the data system, and more specifically the SAS domain 100, are now discussed with respect to the flowchart of FIG. 2.

Figure 2:
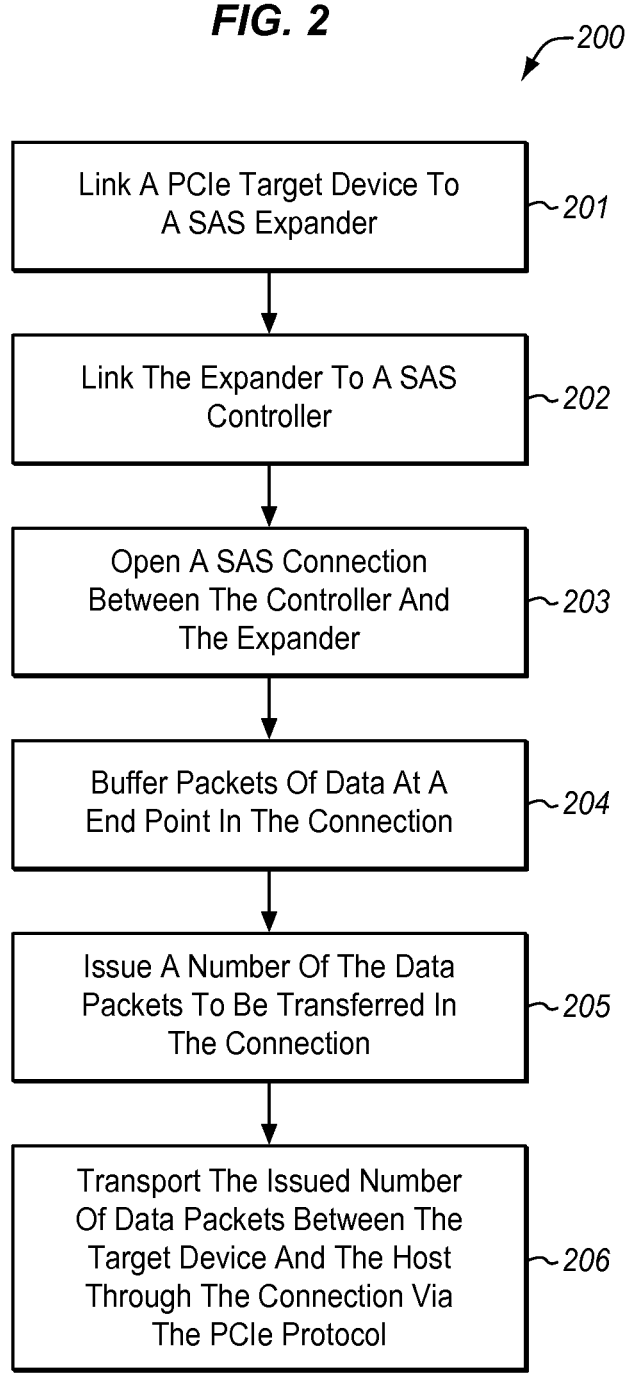
FIG. 2 is a flowchart of an exemplary process for tunneling PCIe data through a SAS domain.

FIG. 2 is a flowchart of an exemplary process 200 for tunneling PCIe data through a SAS domain 100. In this embodiment, a PCIe target device 111 is linked to a SAS expander (process element 201) and the expander is linked to the PCIe/SAS controller 104 (process element 202). As mentioned, the PCIe/SAS controller 104 is linked to the PCIe host system 105 (either as part of the PCIe host system 105 or distinct from the PCIe host system 105) so as to transfer PCIe data packets on behalf of the PCIe host system 105. Thus, the SAS domain 100 with endpoints of PCIe components is established (e.g., either through the PCIe/SAS controller 104 to the PCIe/SAS expander 103 through the PCIe/SAS controller 104 to the PCIe/SAS expander 101).

In the process element 203, one of the SAS components in the SAS domain 100 opens a SAS connection between the PCIe/SAS controller 104 and the SAS expander. For example, one of the PCIe target devices 111 may need to transfer PCIe based data packets to the PCIe host 105. Accordingly, the PCIe target 111 may direct the PCIe/SAS expander 101/103 to open a connection with the PCIe/SAS controller 104. Alternatively, the PCIe host system 105 may need to transfer PCIe based data packets to the PCIe target device 111. The PCIe host system 105 may then direct the PCIe/SAS controller 104 to open the SAS connection to the target device 111. In either case, the PCIe data packets are buffered at the end points of the SAS connection, in the process element 204, either at the PCIe/SAS controller 104 or at the PCIe/SAS expander 101/103 until such time as the SAS connection may be opened to effect the transfer of the PCIe data packets.

Before transferring data packets between the end points of the SAS connection, the PCIe/SAS component (i.e., the controller 104 or the expander 101/103) issues a number of the PCIe data packets that are to be transferred through the SAS connection, in the process element 205. For example, since the PCIe protocol is a connectionless data transfer protocol, PCIe data packets are tracked through the SAS connection to ensure that they arrive at the proper PCIe endpoint. In one embodiment, each end point of the SAS connection transfers an amount of credits available (e.g., representing available buffer space) at a next buffering node via Data Link Layer Packets (DLLP) of the PCIe protocol such that credit management of the data packets may be handled at the end points of the SAS connection.

With the connection established and the number of PCIe data packets being monitored, each end point of the SAS connection may retrieve the PCIe Transaction Layer Packets (TLP) from the buffer in the end point to transport the issued number of data packets between the target device 111 and the PCIe host system 105 through the SAS connection via the PCIe protocol, in the process element 206, thereby tunneling PCIe traffic through the SAS connection. Additional details regarding the implementation of the PCIe tunneling through the SAS domain 100 are shown and described in the embodiments below.

Figure 3:
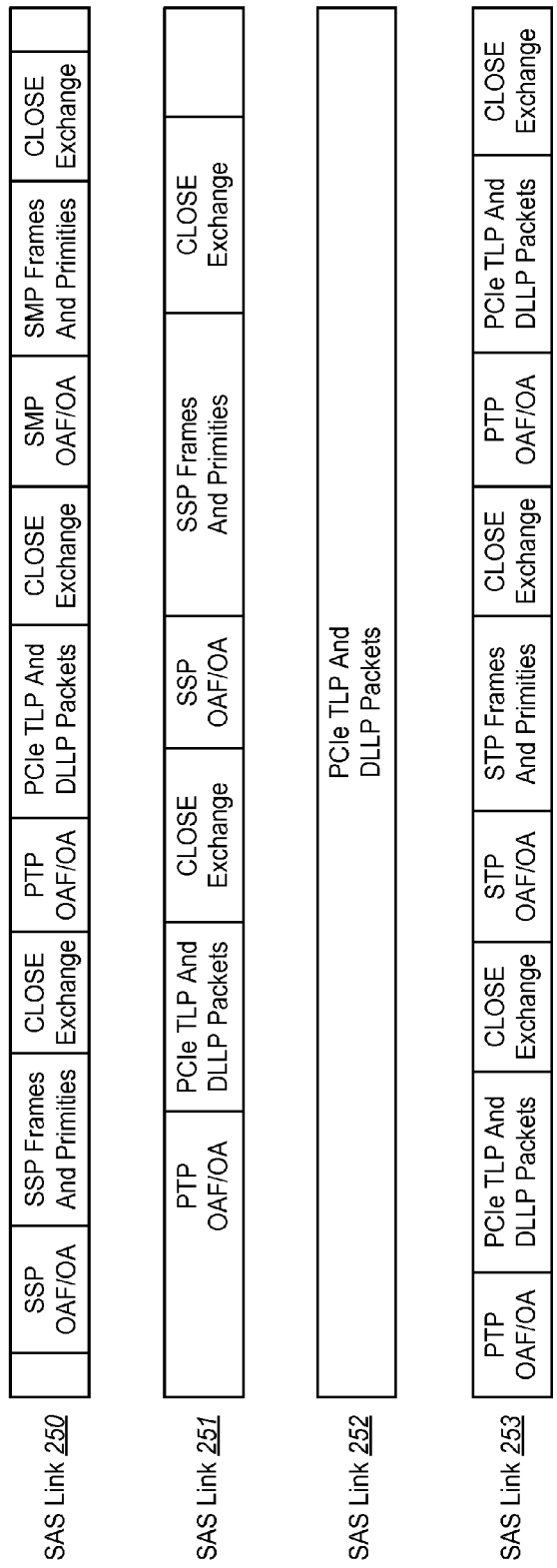
FIG. 3 is an exemplary block diagram of SAS links that are operable to establish SAS connections between SAS components in a SAS domain and tunnel PCIe data packets.

FIG. 3 is an exemplary block diagram of SAS links that are operable to establish SAS connections between SAS devices to tunnel PCIe data packets. Individual SAS connections and associated data transfers occur with an "x1" Phy width while PCIe may have "x1", "x2", "x4" or more actual Phys used to facilitate logical interconnects. Connections within the SAS domain 100 of FIG. 1 are operable to transport a dynamic mix of traffic as illustrated herein. In this example, a mix of PCIe and SAS traffic is carried on a 4-phy SAS wideport.

A typical SAS connection protocol transpires with an Open Address Frame (OAF) receiving an Open Accept (OA) in response thereby establishing the SAS connection, as illustrated in SAS link 250. Once the SAS connection is open, SAS Data frames or PCIe Data packets and associated control are exchanged within the open SAS connection. The SAS connection subsequently closes when CLOSE primitives are exchanged prompting all expanders servicing the connection to tear down the route, as illustrated in the SAS links 250, 251, and 253.

Four different protocols are also illustrated in this example—the Serial SCSI Protocol (SSP) in SAS link 250, the Serial ATA Tunneled Protocol (STP) in the SAS link 253, the Serial Management Protocol (SMP) in the SAS link 250, and a PCIe Tunneled Protocol (PTP) in the SAS links 250 and 253. More specifically, the SAS link 250 illustrates the opening of a SAS connection via the SSP such that SSP frames and primitives may be transferred between end points. After that connection is closed, the SAS component (e.g., the expanders 101/103 and/or the PCIe/SAS controller 104) is operable to open a SAS connection via the PTP such that PCIe data packets may be transferred via Transaction Layer Packets (TLP) and Data Link Layer Packets (DLLP) of the PCIe protocol. After the PCIe data packets are transferred, the SAS connection is closed and available for another data transfer, in this case via the SMP.

The SAS link 251 illustrates a similar embodiment where PCIe data packets are transferred through a SAS connection via the PTP. Here, the PTP opens and closes the connection allowing for an SSP connection afterwards on the SAS link 251.

The SAS link 252 is entirely dedicated to providing PCIe data traffic via the PTP. For example, a SAS connection established for transferring PCIe packets may be a persistent connection if a static allocation of PCIe bandwidth is desired. The PTP can operate in a SAS domain which includes intermediate legacy SAS expanders, such as the SAS expander 102, by leveraging legacy OAFs with some additional qualification. For example, a PTP connection may be opened using the legacy STP protocol with the compatible features field in the OAF thereby qualifying the type of tunneling as PTP. The intermediate expander in this case operates as normal since it simply forwards DWORDS once a SAS connection is open while waiting for SAS CLOSE primitives to be exchanged between connection endpoints of the SAS connection.

The SAS link 253 illustrates similar open and closes of the SAS connection with the PTP along with an open and close of a SAS connection for STP. Thus, the SAS links are not limited to any particular protocol. That is, the SAS links herein may be used to dedicate PCIe traffic through the SAS domain 100 and/or include other forms of data traffic via the SSP, STP, SMP, and PTP through the SAS openings and closings of SAS connections over any particular link.

Figure 4:
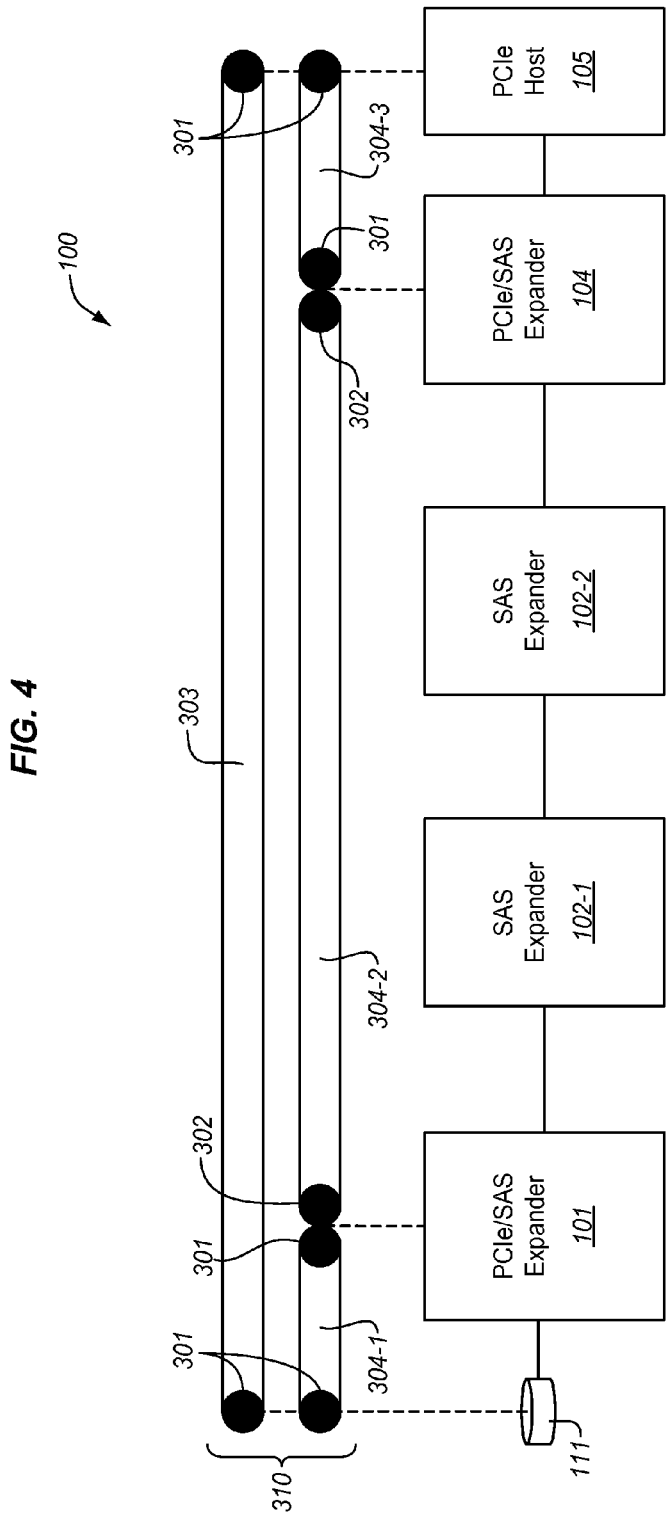
FIG. 4 is a block diagram of exemplary PCIe tunneling through a SAS domain.

FIG. 4 is a block diagram of an exemplary PCIe tunneling through the SAS domain 100 as similarly illustrated in FIG. 1. This figure shows that PCIe TLPs in the TLP data stream 303 flow between end PCIe devices 301 while PCIe DLLPs traverse native PCIe links of the DLLP packet streams 304-1 and 304-3 as well as being tunneled through the DLLP packet streams 304-2. For the purposes of illustration, the SAS domain 100 is configured with a PCIe/SAS expander 101, a pair of SAS expanders 102-1 and 102-2, and a PCIe/SAS controller 104. A SAS connection is established for the overall PCIe packet path 310 corresponding to the path 304-2 is established as discussed above using OAFs and OAs of the SAS protocol. PCIe endpoints 301 are established by the PCIe host system 105 coupling to the PCIe/SAS controller 104 and by the PCIe target device 111 coupling to the PCIe/SAS expander 101. SAS domain connection endpoints 302 are established based on SAS connections through the SAS components of the expander 101, expanders 102, and the controller 104.

As mentioned, to implement the PCIe tunneling through the SAS domain 100, PCIe data packets may be buffered at connection endpoints 302 in the SAS domain 100. Then, DLLP packets of the PCIe protocol may be used to track the TLP data packets in the PCIe protocol. For example, the PCIe protocol provides for both TLPs and DLLPs. DLLP packet streams 304-1, 304-2, and 304-3 may be configured along the PCIe packet path 310 at the various connection endpoints 301 and 302 to track the TLP data packets in the TLP data stream 303 between the PCIe target device 111 and the PCIe/SAS controller 104 at their corresponding connection endpoints 301. TLPs support end user data transmission while the DLLP packets are used between PCIe Link functions to manage flow control and acknowledge TLPs. FIG. 4 illustrates how TLPs pass through the SAS domain 100 along the TLP data path 303 in the PCIe packet path 310 on their way between native PCIe path endpoints 301 while the DLLPs are terminated at SAS connection endpoints 302 of the SAS domain 100.

An independent DLLP packet stream 304-2 is exchanged over the SAS connection portion of the PCIe packet path 310 between the PCIe/SAS expander 101 and the PCIe/SAS controller 104 to manage PCIe flow control and TLP acknowledgement as PCIe packets traverse the SAS domain 100. While a single TLP packet stream 303 is shown, multiple TLP packet streams can be and typically are supported over a single SAS connection (e.g., multiple PCIe target devices 111 may be serviced in one SAS connection). The multiple TLP packet streams may be implemented with PCIe/SAS aggregation of the target devices 111 attached to any of the PCIe/SAS expanders 101 and 103, as similarly illustrated in FIG. 1.

Figure 5:
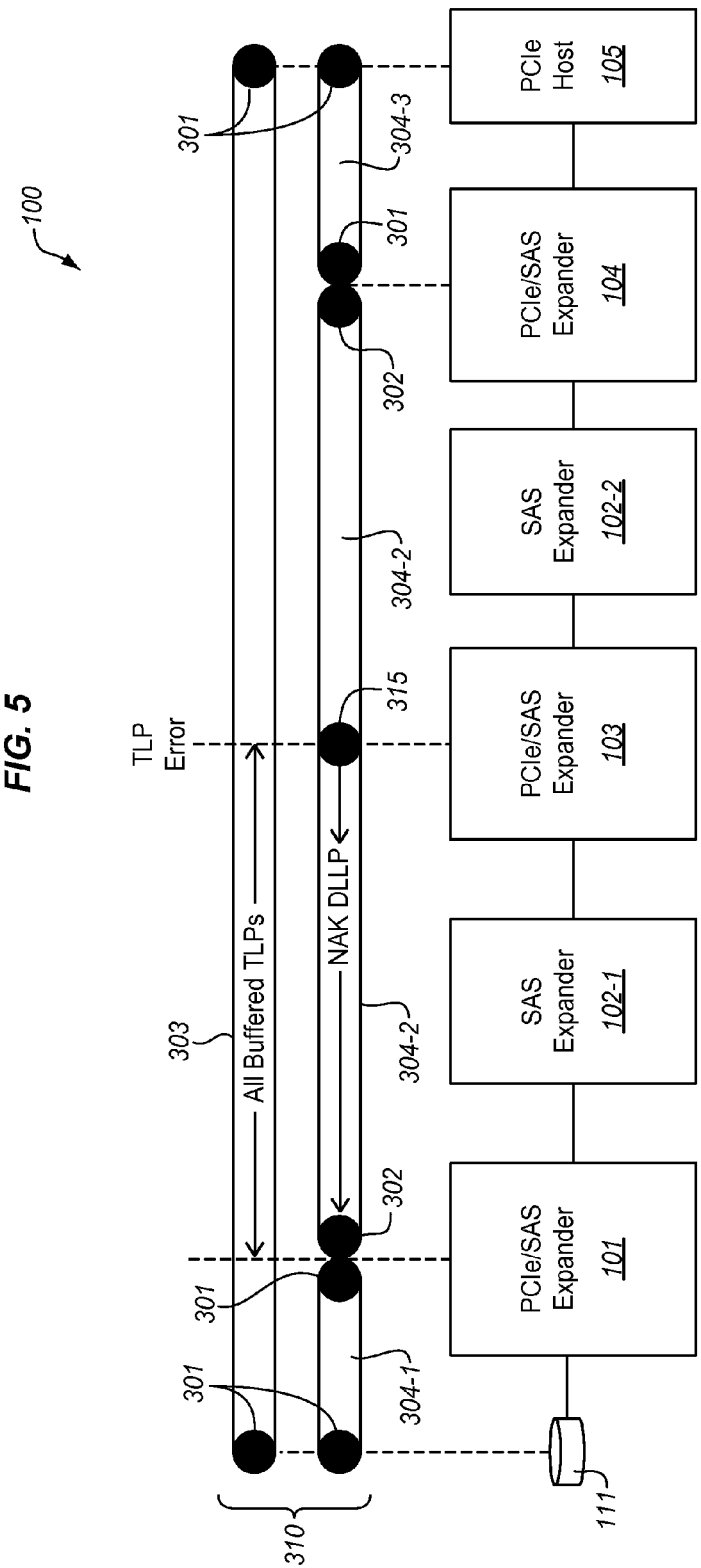
FIG. 5 is another block diagram of exemplary PCIe tunneling through a SAS domain.

Appropriate TLP sequence number substitution occurs within the Phy/Link layer of the PCIe/SAS expander 101 and the PCIe/SAS controller 105. Additionally PCIe "replay" buffers may be configured at each of the DLLP end points 302 along the DLLP packet stream 304-2. These replay buffers may be invoked for lost or errored TLPs across the traditional PCIe segments as well as in the PCIe packet path 310. Alternatively, DLLP termination and associated PCIe replay buffers can be implemented at an intermediate PCIe/SAS expander 103 along the DLLP packet stream 304-2, as illustrated in FIG. 5. For example, the PCIe protocol acknowledges every TLP moved. If a destination node for a TLP detects an error in the TLP (e.g., a bad CRC, a bad symbol, etc.), the destination node sends a NAK DLLP back to the source node as opposed to an ACK DLLP. The source node keeps a copy of every TLP that it has sent and that has not yet been acknowledged in a replay buffer. When the source node receives the NAK DLLP, it re-sends all TLPs stored in the replay buffer starting with the TLP that arrived with error.

Figure 6:
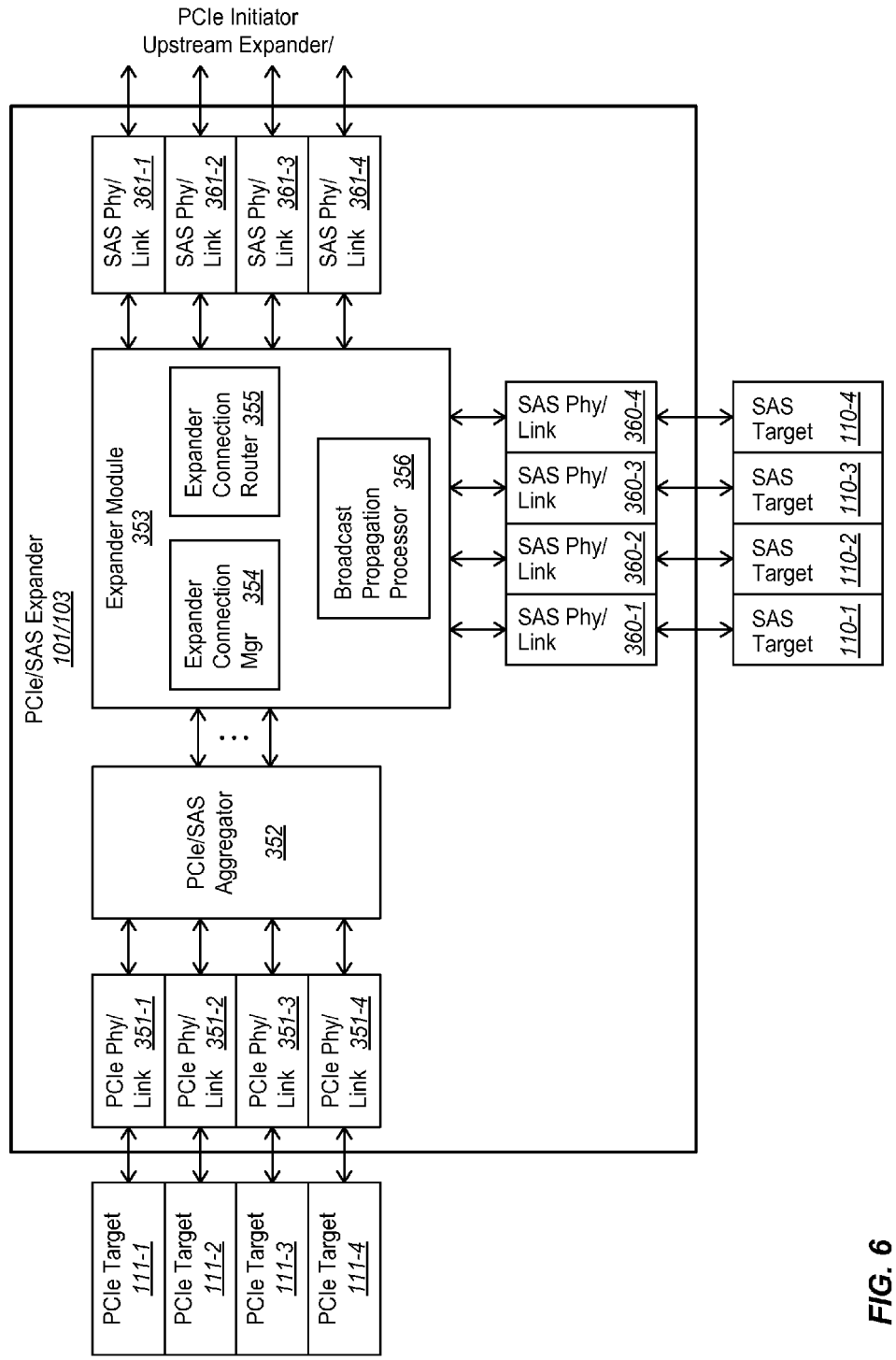
FIG. 6 is a block diagram of an exemplary PCIe capable SAS expander.

FIG. 6 is a block diagram of an exemplary PCIe/SAS expander 101/103. The PCIe/SAS expander 101/103 is operable to support SAS target devices 110 and the PCIe target devices 111. In this regard, PCIe traffic and SAS traffic are both serviced by the expander module 353 through corresponding PCIe Phys/Links 351-1-4, SAS Phys/Links 360-1-4, and SAS Phys/Links 361-1-4. For example, SAS Phys/Links 361-1-4 may be coupled to the upstream SAS expander 102. Thus, the SAS Phys/Links 361-1-4 are operable to couple to corresponding SAS Phys/Links of the upstream SAS expander 102 and establish a SAS connection through which PCIe data may be transferred from another PCIe capable device (e.g., another PCIe/SAS expander or the PCIe/SAS controller 104).

The expander module 353 comprises an expander connection router 355, an expander connection manager 354, and a broadcast propagation processor 356. The expander connection manager 354 services requests to establish connections of various link layers within the expander. The expander connection router 355 provides a switching function between link layers within the expander. The broadcast propagation processor 356 is operable to discover attached PCIe target devices 111 through a PCIe/SAS aggregator 352, process incoming broadcast requests, and ensure that the requests are forwarded per SAS protocol requirements. Generally, the discovered information pertaining to the attached PCIe target devices 111 is made available to PCIe capable SAS initiators such as the PCIe/SAS controller 104, in essence, shielding the information from traditional legacy SAS controllers, for example by either vendor-unique SMP functions or new standardized SMP PCIe Device Discover functions. Each of these modules generally retains its standard SAS behavior while servicing PCIe tunneled connections.

The PCIe/SAS aggregator 352 provides PCIe control, per-device credit management, and buffering needed to support multiple PCIe target devices 111 while presenting a standard interface to the standard SAS expander function of the expander module 353. PCIe credit management is a scheme of the PCIe protocol that allows a PCIe device to advertise an initial amount of credit for each receive buffer in its transaction layer (i.e., the TLP). The device at the opposite end of the link, when sending transactions to this device, counts the number of credits each TLP consumes from its account. The sending PCIe device transmits a TLP when its consumed credit count has not exceeded its credit limit. When the receiving device finishes processing the TLP from its buffer, the receiving device signals a return of credits to the sending device, which increases the credit limit by the restored amount. When the PCIe data packets are tunneled through a SAS connection in this manner, DLLPs are passed through intermediate expanders such that a PCIe/SAS aggregator 352 and the PCIe/SAS interworking initiator (explained in greater detail below) can directly exchange DLLP frames for the duration of the SAS connection.

Because PCIe traffic is packetized, it allows multiple PCIe target devices 111 to share a single physical SAS connection. And, as such, PCIe traffic being carried on one or more connection requests from the PCIe/SAS aggregator 352 to the expander connection manager 354 and the expander connection router 355 to establish appropriate bandwidth for servicing the attached PCIe target devices 111. In other words, there is no fundamental relationship between the number of serviced PCIe target devices 111 and the number of expander function interfaces used.

When sharing multiple SAS connections among the multiple PCIe target devices 111, TLP sequence numbers are tracked independently for each PCIe target device 111. The TLP sequence numbers are used to ensure that packets are delivered in order to their prescribed destination. In one embodiment, a pathway identifier is included along with a TLP sequence number at the start of the TLP preparing packets for transmission across the SAS domain 100. For example, a first nibble in a TLP adjacent to the TLP sequence number is normally set to all logical "0s". The first nibble could instead be used to encode multiple different pathways (e.g., 16) to unique PCIe target devices 111. Alternatively or additionally, the PCIe/SAS aggregator 352 could inspect a TLP header to discern a particular addressing and routing which applies to a TLP, thereby removing limits to the number of PCIe target devices 111 that could share a set of SAS connections.

Figure 7:
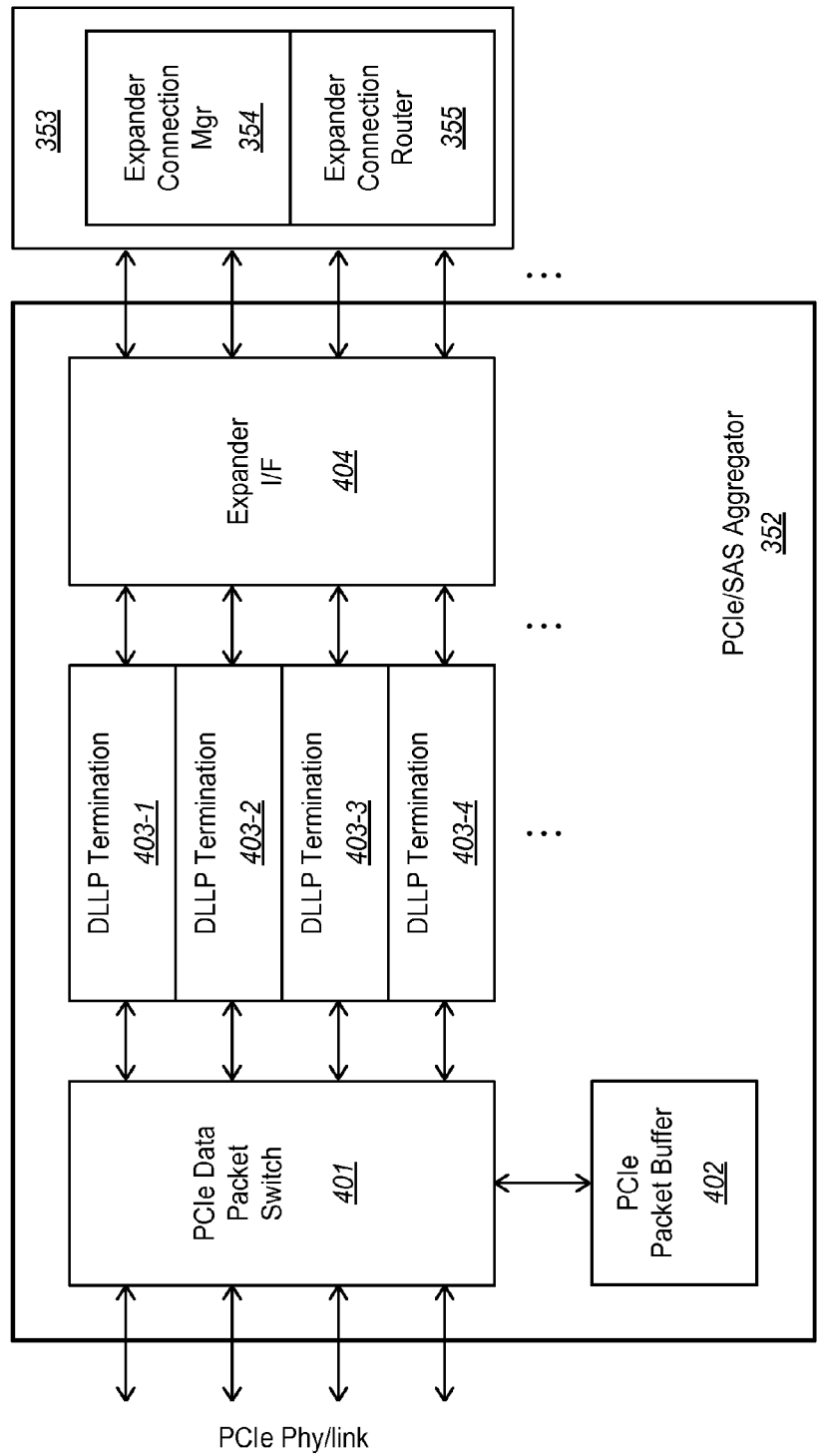
FIG. 7 is a block diagram of an exemplary PCIe target aggregator of the PCIe capable SAS expander of FIG. 6.

FIG. 7 is a block diagram of an exemplary PCIe/SAS aggregator 352 of the PCIe/SAS expander 101/103 of FIG. 6. In this embodiment, the PCIe/SAS aggregator 352 comprises an expander interface 404 that is operable to process requests for SAS connections to and from the expander connection manager 354 and the expander connection router 355 of the PCIe/SAS expander 101/103. Once a SAS connection is established, one or more streams of PCIe packets may be passed through the expander interface 101. In this regard, a DLLP connection endpoint 301 is provided with the DLLP termination modules 403-1-4 for each open SAS connection to terminate the DLLP packets transferred over the SAS domain 100 between the PCIe/SAS expander 101/103 and the PCIe/SAS controller 104. As mentioned, these the DLLP packets acknowledge end-to-end TLP packets and manage credit available for PCIe packet transmission through the SAS domain 100.

PCIe TLPs move through the DLLP termination modules 403-1-4 into the PCIe data packet switch 401. The PCIe data packet switch 401 maintains flow control credit information for each PCIe Phy/Link and makes credit-based decisions on whether to forward data packets between DLLP terminations 403-1-4 and the PCIe Phy/Link, or to temporarily buffer a data packet that cannot be immediately passed along due to a lack of credit. When credit becomes available, the PCIe data packet switch 401 forwards TLPs stored in the PCIe packet buffer 402 to the PCIe Phy/Link or the DLLP Terminations 403-1-4, depending on the destination of the data packet.

As mentioned, SAS connections may be dedicated to the persistent use of PCIe traffic when bandwidth of a particular SAS link is to be maximized for PCIe traffic. Otherwise, the bandwidth available to the PCIe target devices 111 is generally a function of credits available in the PCIe/SAS aggregator 352 which is generally a function of the available SAS bandwidth and upstream bandwidth the PCIe host system 105.

Figure 8:
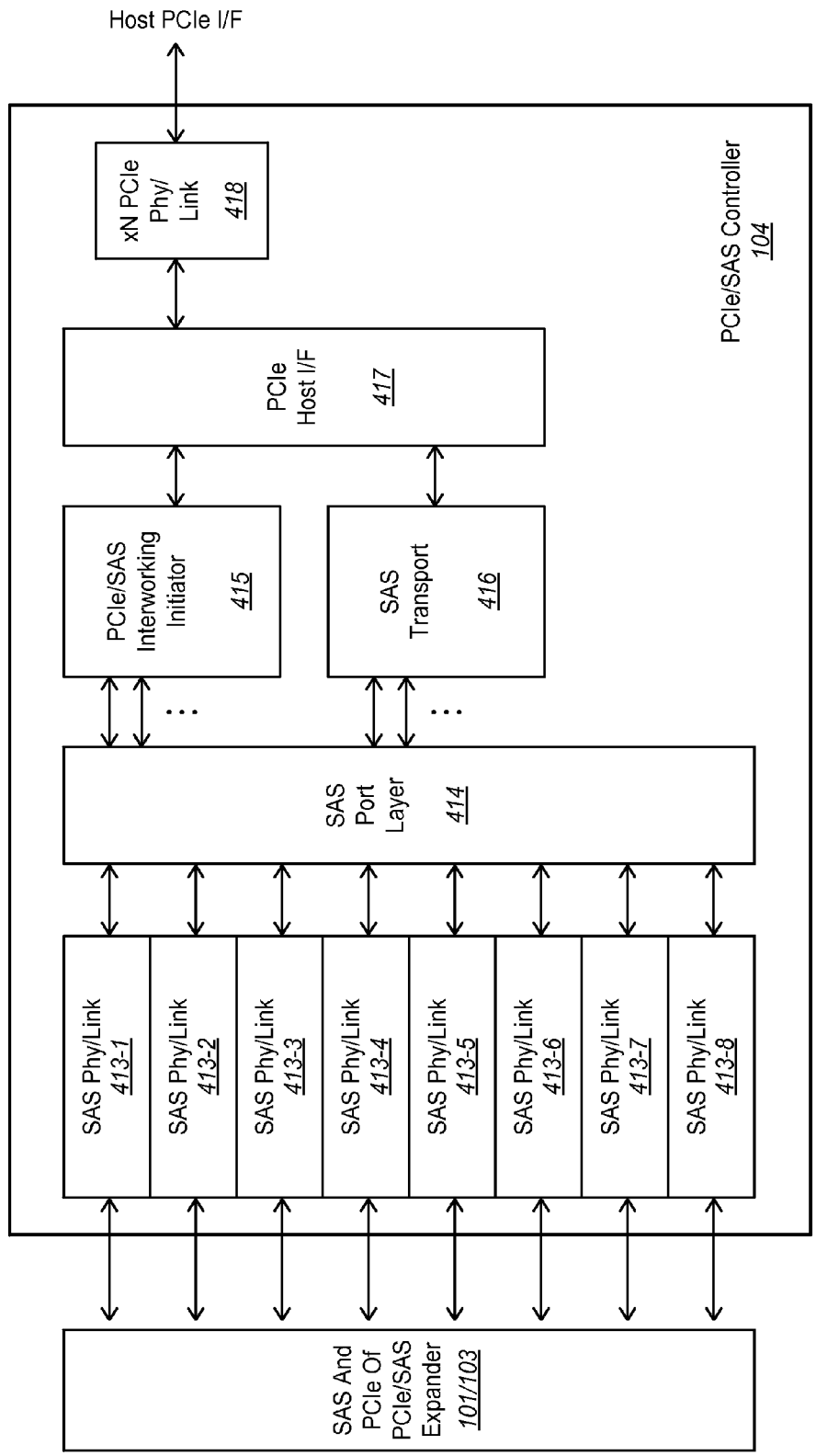
FIG. 8 is a block diagram of an exemplary PCIe capable SAS controller.

FIG. 8 is a block diagram of an exemplary PCIe/SAS controller 104. The PCIe/SAS controller 104 is operable to support traditional SAS target devices 110 and PCIe target devices 111. The PCIe/SAS controller 104 is operable to perform PCIe enumeration of downstream PCIe target devices 111 to establish a topology of the PCIe target devices 111 attached to the SAS domain 100, thereby operating as a "root complex" for the PCIe target devices 111. The PCIe/SAS controller 104 comprises a PCIe/SAS interworking initiator 415 that manages PCIe control and PCIe/SAS connection credit management according to the PCIe protocol. In this regard, the PCIe/SAS interworking initiator 415 provides buffering to support multiple downstream PCIe/SAS expanders 101/103. For example, as the PCIe protocol is a connectionless protocol, data packets need to be buffered at PCIe connection endpoints within the SAS domain 100 to control and track the transfer of PCIe data packets through the SAS connection. The PCIe/SAS interworking initiator 415 provides buffering of data packets from the PCIe host system 105 and manages the credits associated with the PCIe data packets being transferred to its destination PCIe/SAS expander 101/103.

The PCIe/SAS interworking initiator 415 operates to some extent as a nontransparent PCIe bridge shielding the PCIe host system 105 from the connection details of PCIe target devices 111 that are attached to PCIe/SAS expanders 101/103 accessible through the SAS domain 100. In other words, the complexity of the connection, routing, and transfer of data packets to/from the various PCIe target devices 111 through the SAS domain 100 is pushed down into the PCIe/SAS controller 104 such that the PCIe host system 105 can utilize its processing capabilities for other tasks. In this regard, the PCIe/SAS interworking initiator 415 works with the SAS port layer 414 to route the data packets to their destination PCIe/SAS expanders 101/103. In other words, the SAS port layer 414 operates as a switching function to route the PCIe data packets as directed by the PCIe/SAS interworking initiator 415.

The PCIe/SAS controller 104 also includes a SAS transport module 416 to route SAS data between SAS target devices 110 attached to expanders in the SAS domain 100, either legacy SAS expanders 102 or PCIe/SAS expanders 101/103. The SAS transport module 416 operates to provide traditional SAS communications to the SAS target devices 110 via the switching of the SAS port layer 414.

A PCIe host interface 417 is configured with the PCIe/SAS controller 104 to provide communications between the SAS domain 100 and the PCIe domain of the PCIe host system 105. For example, an "xN" PCIe Phy/Link 418 receives PCIe data packets according to the PCIe logical interconnects of the PCIe host system 105 (e.g., x1 Phys, x2 Phys, x4 Phys, etc.). If those data packets are destined for SAS target devices 110, the PCIe host interface 417 translates those data packets into SAS data for transport to the SAS target devices 110 through the SAS domain 100 via the SAS transport module 416.

Figure 9:
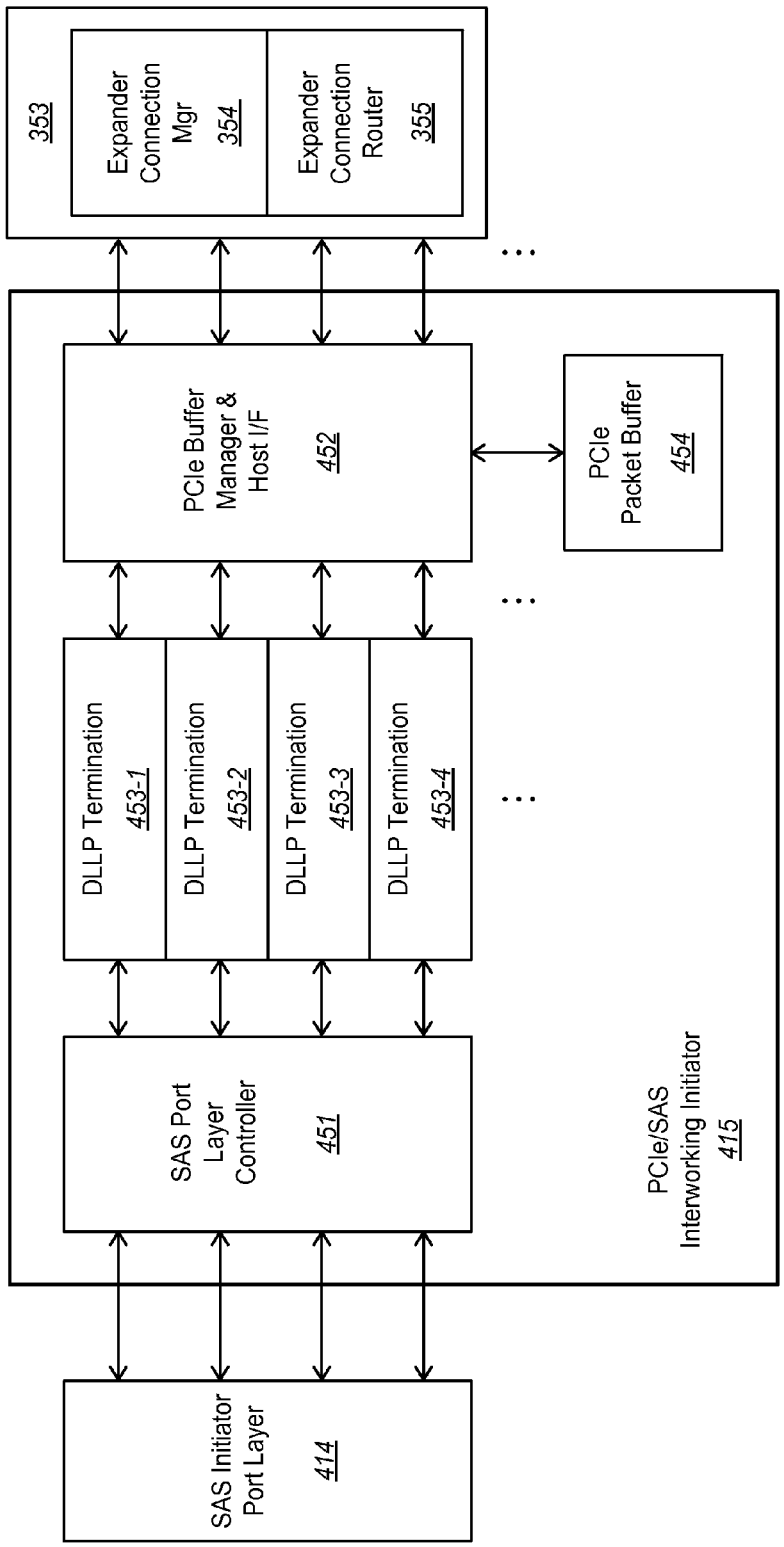
FIG. 9 is a block diagram of an exemplary PCIe/SAS interworking initiator of the PCIe capable SAS controller of FIG. 8.

FIG. 9 is a block diagram of an exemplary PCIe/SAS interworking initiator 415 of the PCIe/SAS controller 104 of FIG. 8. The PCIe/SAS interworking initiator 415 interacts with a SAS port layer controller 451 to establish SAS connections for the purpose of transferring PCIe TLP data packets to and from a PCIe/SAS expander 101/103. The PCIe TLP data packets are stored in a PCIe packet buffer 454 which is controlled by PCIe buffer manager and host system interface 452. Again, according to the above embodiments, the PCIe data packets are buffered at connection endpoints in the SAS domain 100 during transfer of PCIe data packets between the PCIe host system 105 and PCIe target device 111. The PCIe packet buffer 454, in this regard, operates as a nontransparent bridge interworking point of the SAS end point 302 and the PCIe endpoint 301.

The DLLP termination modules 453-1-4 terminate DLLP packets passed between a PCIe/SAS expander 101/103 and the PCIe/SAS controller 104 in the manner similar to the DLLP termination modules 403 of the PCIe/SAS aggregator 352. This allows the DLLP packets to acknowledge TLP packets and manage credit available for PCIe packet transmission through the SAS connections.

To provide further illustration, when PCIe data packets are to be transferred between a PCIe target device 111 attached to a PCIe/SAS expander 101/103 and the PCIe/SAS controller 104, a standard SAS OAF from the component needing to transfer the PCIe data packets establishes a SAS connection between the two components. The SAS connection is open as long as either component in the PCIe data packets transfer has PCIe data packets to send or as otherwise directed by the SAS protocol. When the component no longer needs to transfer PCIe data packets, that component issues a CLOSE primitive of the SAS protocol. As with STP connections, once a CLOSE primitive exchanged in both directions, the SAS connection is terminated and subsequently torn down by the expanders 101/102/103 participating in the connection.

To improve full duplex utilization of an open connection, one side of the connection may wait before sending its CLOSE primitive until after it receives a CLOSE primitive from the component in the connection that initiated the SAS connection. Alternatively or additionally, closing of a SAS connection may be performed by interpreting TLP data packets being transferred between a PCIe target device 111 and the PCIe/SAS controller 104 in the SAS connection. This may assist in predicting bandwidth requirements in subsequent SAS connections. A persistent SAS connection, however, can be implemented as discussed above to provide the requisite bandwidth for the PCIe traffic. Persistent SAS connections may be implemented as a variant of SPL-3 persistent connections using the EXTEND CONNECTION primitive and the associated timers of the SAS protocol.

In any case, the PCIe/SAS aggregator 352 of an expander 101/103 and the PCIe/SAS interworking initiator 405 of the PCIe/SAS controller 104 regard the closing of the SAS connection as an indication to hold a current state of any PCIe credit, TLP sequence numbers, and any other parameters associated with DLLP pathway between the SAS components. Explicit encodings in the SAS protocol may be used to implement PTP and identify a PTP connection in the SAS domain 100. Alternatively, a separate World Wide Name (WWN) at the PCIe/SAS controller 104 may be used to direct the PTP connection to the PCIe/SAS interworking initiator 405. Then, unique WWNs may be used at the PCIe/SAS expander 101/103 to identify plurality of attached PCIe target devices 111 and cue the expander connection manager 354 to complete the SAS connection to the PCIe/SAS aggregator 352. The SAS connection may also be established using the STP up to the point when the OA is received and DWORDs are forwarded by intermediate expanders thus being operable with legacy expanders (e.g., the expander 102).

Once a PTP connection through the SAS domain 100 has been opened, PCIe rules generally apply for all PCIe data packets transmissions in a manner similar to STP rules applying to STP data transfers in the SAS domain 100. For example, when a SAS connection is open, DWORDS are forwarded through intermediate expanders such that the PCIe communication may be accurately rendered at the end of the SAS connection. In one embodiment, the SAS connection may be closed based on buffer levels of the PCIe data packets in the PCIe/SAS expander 101/103 and/or the PCIe/SAS controller 104. To illustrate, if the PCIe/SAS controller 104 is unable to send PCIe data packets to the PCIe/SAS expander 101 because it lacks credit to do so (i.e., because the PCIe Packet Buffer 402 has no available buffer space), the PCIe/SAS controller 104 may choose to close the SAS connection to the PCIe/SAS expander 101. The connection may also be closed based on progress in sending some predetermined quantity of packets or if the buffer levels go to zero.

Figure 10:
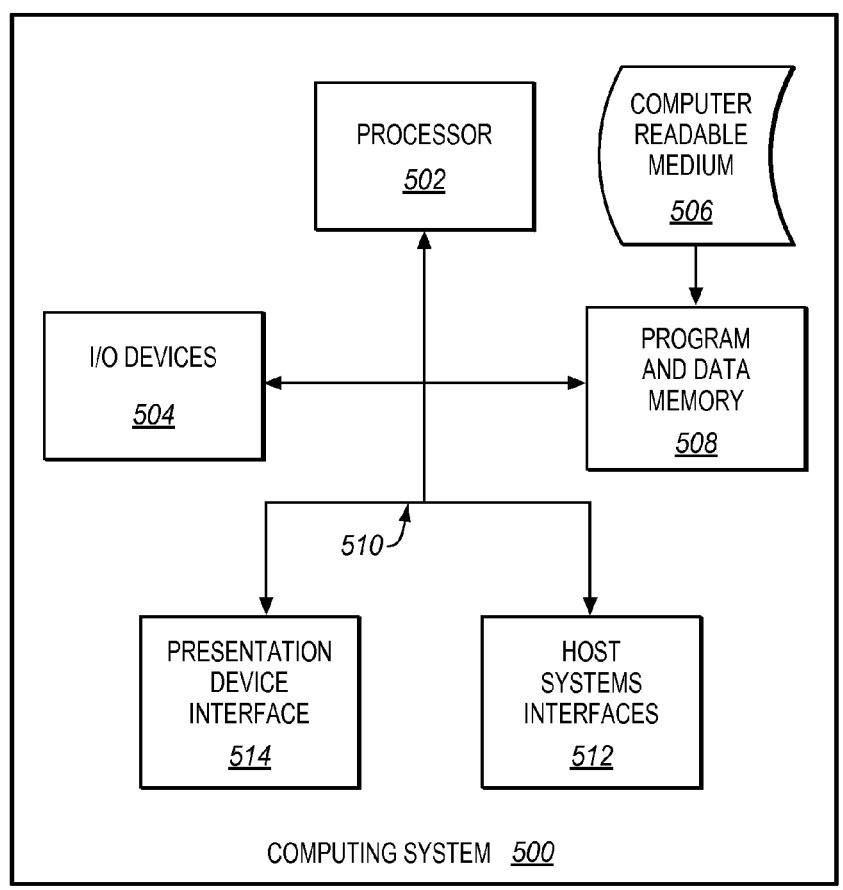
FIG. 10 is a block diagram of an exemplary computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 10 illustrates a computing system 500 in which a computer readable medium 506 may provide instructions for performing any of the methods disclosed herein.

Furthermore, the invention can take the form of a computer program product accessible from the computer readable medium 506 providing program code for use by or in connection with a computer or any instruction execution system. For the purposes of this description, the computer readable medium 506 can be any apparatus that can tangibly store the program for use by or in connection with the instruction execution system, apparatus, or device, including the computer system 500.

The medium 506 can be any tangible electronic, magnetic, optical, electromagnetic, infrared, or semiconductor system (or apparatus or device). Examples of a computer readable medium 506 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The computing system 500, suitable for storing and/or executing program code, can include one or more processors 502 coupled directly or indirectly to memory 508 through a system bus 510. The memory 508 can include local memory employed during actual execution of the program code, bulk storage, and cache memories which provide temporary storage of at least some program code in order to reduce the number of times code is retrieved from bulk storage during execution. Input/output or I/O devices 504 (including but not limited to keyboards, displays, pointing devices, etc.) can be coupled to the system either directly or through intervening I/O controllers. Network adapters may also be coupled to the system to enable the computing system 500 to become coupled to other data processing systems, such as through host systems interfaces 512, or remote printers or storage devices through intervening private or public networks. Modems, cable modem and Ethernet cards are just a few of the currently available types of network adapters.

What is claimed is:

1. A method operable in a Serial Attached Small Computer System Interface architecture, the method comprising:
   linking a Peripheral Component Interconnect Express target device to a Serial Attached Small Computer System Interface expander;
   linking the expander to a Serial Attached Small Computer System Interface controller;
   opening a Serial Attached Small Computer System Interface connection between the controller and the expander;
   buffering packets of data at an end point in the connection;
   issuing a number of the data packets to be transferred in the connection; and
   transporting the issued number of data packets between the target device and a host system through the connection via the Peripheral Component Interconnect Express protocol.

2. The method of claim 1, further comprising:
   connecting the expander to a plurality of Peripheral Component Interconnect Express target devices; and
   routing Peripheral Component Interconnect Express data from the host system to the Peripheral Component Interconnect Express target devices.

3. The method of claim 2, further comprising:
   aggregating the plurality of Peripheral Component Interconnect Express target devices to represent the Peripheral Component Interconnect Express target devices to another Serial Attached Small Computer System Interface expander as a single Peripheral Component Interconnect Express target device.

4. The method of claim 1, further comprising:
   exchanging Data Link Layer Packets between the expander and the controller.

5. The method of claim 4, further comprising:
   terminating and processing the Data Link Layer Packets at the controller; and
   performing credit management of Transaction Layer Packets via the Data Link Layer Packets at the controller.

6. The method of claim 4, further comprising:
   terminating and processing the Data Link Layer Packets at the expander; and
   performing credit management of Transaction Layer Packets via the Data Link Layer Packets at the expander.

7. The method of claim 1, further comprising:
   exchanging Data Link Layer Packets between the expander and another Serial Attached Small Computer System Interface expander configured between the expander and the controller.

8. The method of claim 1, further comprising:
   providing a pathway identifier field from the controller to switch packets to the target device.

9. A data system, comprising:
   a Serial Attached Small Computer System Interface expander;
   a Peripheral Component Interconnect Express target device coupled to the expander; and
   a Serial Attached Small Computer System Interface controller communicatively coupled to a host system and the expander, wherein the controller is operable to open a connection with the expander via the Serial Attached Small Computer System Interface protocol, and to transport packet data between the target device and the host system through the connection via the Peripheral Component Interconnect Express protocol.

10. The data system of claim 9, wherein:
   the expander includes an aggregator operable to connect to a plurality of Peripheral Component Interconnect Express target devices and to route Peripheral Component Interconnect Express data from the host system to the Peripheral Component Interconnect Express target devices.

11. The data system of claim 10, wherein:
   the aggregator is further operable to represent the Peripheral Component Interconnect Express target devices to another Serial Attached Small Computer System Interface expander as a single Peripheral Component Interconnect Express target device.

12. The data system of claim 9, wherein:
   the expander includes an aggregator operable to provide a Serial Attached Small Computer System Interface to another Serial Attached Small Computer System Interface expander.

13. The data system of claim 9, wherein:
   the controller comprises an initiator operable to exchange Data Link Layer Packets with the expander.

14. The data system of claim 13, wherein:
   the initiator comprises:
   a buffer operable to store the Transaction Layer Packets; and
   a buffer manager operable to perform credit management of the Transaction Layer Packets via the Data Link Layer Packets.

15. The data system of claim 9, wherein:
   the controller is further operable to receive Peripheral Component Interconnect Express packet data from the host system, to translate the packet data to Serial Attached Small Computer System Interface data, and to route the Serial Attached Small Computer System Interface data to a Serial Attached Small Computer System Interface target device coupled to the expander.

16. The data system of claim 9, wherein:
   the controller is directly coupled to a plurality of Peripheral Component Interconnect Express target devices to transport packet data between the directly coupled target devices and the host system.

17. The data system of claim 9, wherein:
the controller is further operable to provide a pathway identifier field to switch packets to the target device.

18. A non-transitory computer readable medium comprising instructions that, when executed by a processor of a Serial Attached Small Computer System Interface controller, direct the processor to:
link a Peripheral Component Interconnect Express target device to a Serial Attached Small Computer System Interface expander;
link the expander to the Serial Attached Small Computer System Interface controller;
open a Serial Attached Small Computer System Interface connection between the controller and the expander;
buffer packets of data at an end point in the connection;
issue a number of the data packets to be transferred in the connection; and
transport the issued number of data packets between the target device and a host system through the connection via the Peripheral Component Interconnect Express protocol.

19. The computer readable medium of claim 18, further comprising instructions that direct the processor to:
exchange Data Link Layer Packets between the expander and the controller.

20. The computer readable medium of claim 18, further comprising instructions that direct the processor to:
aggregate a plurality of Peripheral Component Interconnect Express target devices and route Peripheral Component Interconnect Express data from the host system to the Peripheral Component Interconnect Express target devices.

* * * * *